United States Patent [19]
Konczalski

[11] 4,089,088
[45] May 16, 1978

[54] THERMAL REGENERATION AND DECONTAMINATION APPARATUS AND INDUSTRIAL OVEN

[75] Inventor: Ronald L. Konczalski, Grosse Ile, Mich.

[73] Assignee: Michigan Oven Company, Romulus, Mich.

[21] Appl. No.: 773,495

[22] Filed: Mar. 2, 1977

Related U.S. Application Data

[63] Continuation-in-part of Ser. No. 705,147, Jul. 14, 1976, abandoned.

[51] Int. Cl.² ............................ B01J 1/00; B01J 8/00; F23G 7/06; F23L 15/02
[52] U.S. Cl. ............................... 23/277 C; 23/288 B; 23/288 F; 23/288 FB; 23/288 FC; 110/210; 165/7; 165/32
[58] Field of Search ............. 23/288 B, 288 E, 288 F, 23/277 C; 165/5, 6, 8, 7; 432/179, 219; 110/8 A

[56] References Cited
U.S. PATENT DOCUMENTS

| 1,586,816 | 6/1926 | Ljungstrom | 165/5 X |
| 3,509,834 | 5/1970 | Rosenberg et al. | 165/7 X |
| 3,641,763 | 2/1972 | Cole | 23/288 F X |
| 3,942,953 | 3/1976 | Gentry | 165/7 X |

Primary Examiner—Morris O. Wolk
Assistant Examiner—Roger F. Phillips
Attorney, Agent, or Firm—Kinzer, Plyer, Dorn & McEachran

[57] ABSTRACT

An air-permeable reactor medium of large surface area and high thermal capacity, coated with a catalyst, is cycled along a closed path across a first duct carrying an air stream laden with oxidizable contaminants and a second duct carrying a stream of fresh air, enabling contaminants in the first air stream to be oxidized to innoucuous byproducts, releasing heat which is transferred to the fresh air in the second duct, the reaction medium moving at a variable speed which is a function of the temperature of one of the air streams; considerable improvement in the efficiency of an industrial oven may therefore be achieved by positioning the reactor medium to exchange heat between an incoming stream of fresh air and a stream of hotter exhaust gas so that the temperature of fresh air delivered elsewhere to the oven may be controlled without having to rely on dampers and mixtures of air volumes with inherent damper malfunctions or mis-metering; also a second burner may be eliminated because of the manner in which the reactor medium is utilized to exchange heat.

16 Claims, 10 Drawing Figures fig.5.

THERMAL REGENERATION AND DECONTAMINATION APPARATUS AND INDUSTRIAL OVEN

This application is a continuation-in-part of application Ser. No. 705,147, filed July 14, 1976 and now abandoned.

BACKGROUND OF THE INVENTION

There are a variety of industrial processes that produce exhaust gases or other air streams that are entirely unsatisfactory from the standpoint of pollution control, both with respect to contaminants carried by the stream and unacceptable quantities of heat. In many of these processes, the contaminants consist primarily of organic solvents and other like materials that can be oxidized to form innocuous byproducts, water vapor and carbon dioxide. Direct release of the exhaust gas to the atmosphere is not permissible, due to Governmental regulations pertaining to pollution. Furthermore, a direct release of the exhaust gas stream would in most instances represent a highly undesirable heat loss materially reducing overall thermal efficiency.

Recovery of heat from the exhaust gases of industrial processes has frequently been effected, using various forms of heat exchangers. A rotary heat exchanger has been used for this purpose; examples are provided in Ljungstrom U.S. Pat. No. 1,586,816, Karlsson U.S. Pat. No. 2,680,008, and Dravnieks U.S. Pat. No. 3,733,791. These rotary heat exhangers can be quite effective in removing and recovering heat from industrial exhaust gas, but do not remove solvents and other contaminants.

In those instances in which removal of both heat and contaminants is required, it has been customary to provide for treatment of the exhaust or other gas in two separate stages, one for heat exchange and one for contaminant removal, as disclosed in Wenner U.S. Pat. Nos. 3,780,498 and 3,883,326. It has also been known to provide a catalytic cleaner or scrubber for removing contaminants from an air stream, as exemplified by Hirao U.S. Pat. No. 3,607,133, which converts carbon monoxide to carbon dioxide in an air stream, but incorporates no provision for heat exchange, or as exemplified by Cole U.S. Pat. No. 3,641,763 where both conversion and heat exchange are accomplished.

SUMMARY OF THE INVENTION

In comparison to the known practices, it is a principal object of the present invention, to provide a thermal regeneration and decontamination apparatus presenting a cyclically operable, single stage combination catalytic converter and heat exchanger that effectively converts oxidizable contaminants in one stream of air to innocuous byproducts, water vapor and carbon dioxide for example and at the same time transfers the heat of oxidation and other heat present in the first air stream to a second air stream so that the heat can be re-used in the industrial process from which the first air stream originates, while enabling the temperature of one of the air streams to be controlled by varying the speed of the converter.

Another object of the invention is to provide a new and improved catalytic converter unit of the foregoing kind capable of controlling the outlet temperature of an incoming fresh air stream to which the heat of oxidation and other heat in the exhaust gas is transferred.

A more specific object of the invention is to develop an industrial oven of improved efficiency characterized by a new and improved cyclically operable thermal regeneration and decontamination apparatus which provides for the controlled recovery of heat from an exhaust gas stream, which may include both sensible heat from the stream and heat from oxidation of contaminants in the stream, that is simple and economical in construction yet highly efficient in operation.

Cycling means are provided for continuously moving the reactor medium around a closed path traversing a first duct carrying an (exhaust) air stream laden with oxidizable contaminants, a first inter-duct cutoff zone, a second duct affording ingress for a stream of relatively clean air, and a second inter-duct cutoff zone. Thus, the contaminants in the first duct are catalytically oxidized in innocuous byproducts with release of substantial heat transferred to the air in the second duct; the temperature of the air in the second duct is sensed, varying the speed of the cycling means to maintain a constant (sensed) temperature which may be critical in an industrial process oven of the kind disclosed.

DESCRIPTION OF THE PREFERRED EMBODIMENTS

FIGS. 1-4 illustrate a thermal regeneration and decontamination apparatus 10 constructed in accordance with one preferred embodiment of the present invention. Apparatus 10 extends across a first duct 11 comprising an exhaust duct for an industrial process that produces a highly contaminated hot exhaust gas laden with oxidizable contaminants. Typically, the oxidizable contaminants are solvent vapors such as toluene, xylene, etc., though they may constitute other types of contaminants as well. The contaminated hot exhaust gas stream enters apparatus 10 through one section 11A of the exhaust duct 11 and leaves apparatus 10 through a continuing duct section 11B.

Figure 1:
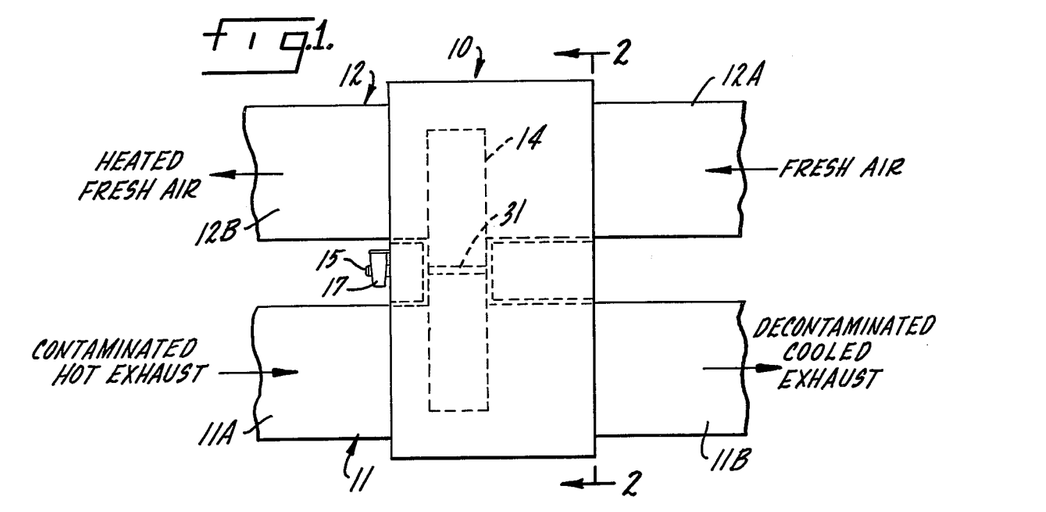
FIG. 1 is a simplified plan view of a thermal regeneration and decontamination apparatus constructed in accordance with the present invention, illustrating the flow of exhaust gas and fresh air streams through the apparatus.

Apparatus 10 also intersects a second duct 12 carrying a fresh air supply. The stream of fresh air enters apparatus 10 through a duct section 12A and leaves through a duct section 12B. The fresh air stream that passes through apparatus 10 may be used for a variety of purposes. Thus, the fresh air, which is heated by passage through apparatus 10, may be employed as a hot fresh air make-up supply for the same process that produces the hot exhaust airstream, or may constitute a heat source for other processes.

Figure 2:
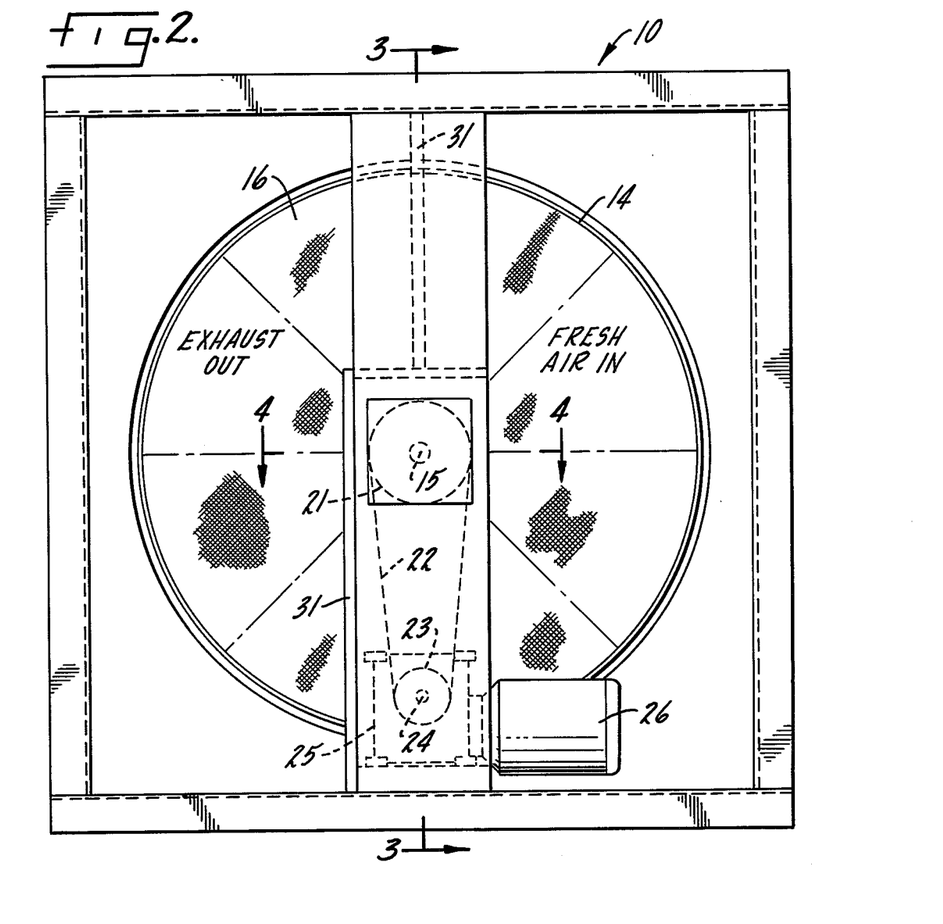
FIG. 2 is an elevation view of the apparatus taken approximately along line 2—2 in FIG. 1.
Figure 3:
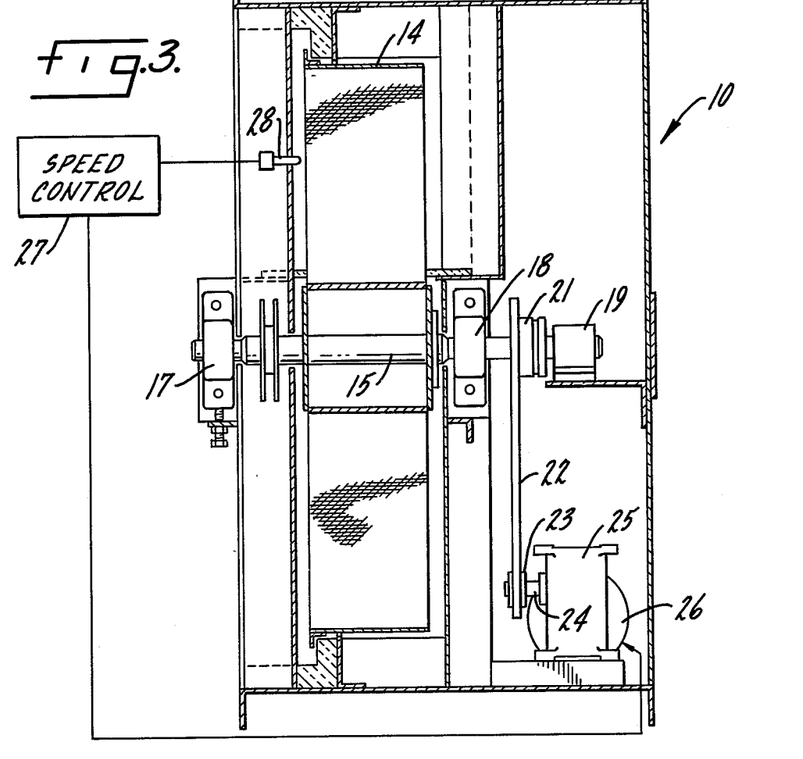
FIG. 3 is a sectional elevation view taken approximately along line 3—3 in FIG. 2.
Figure 4:
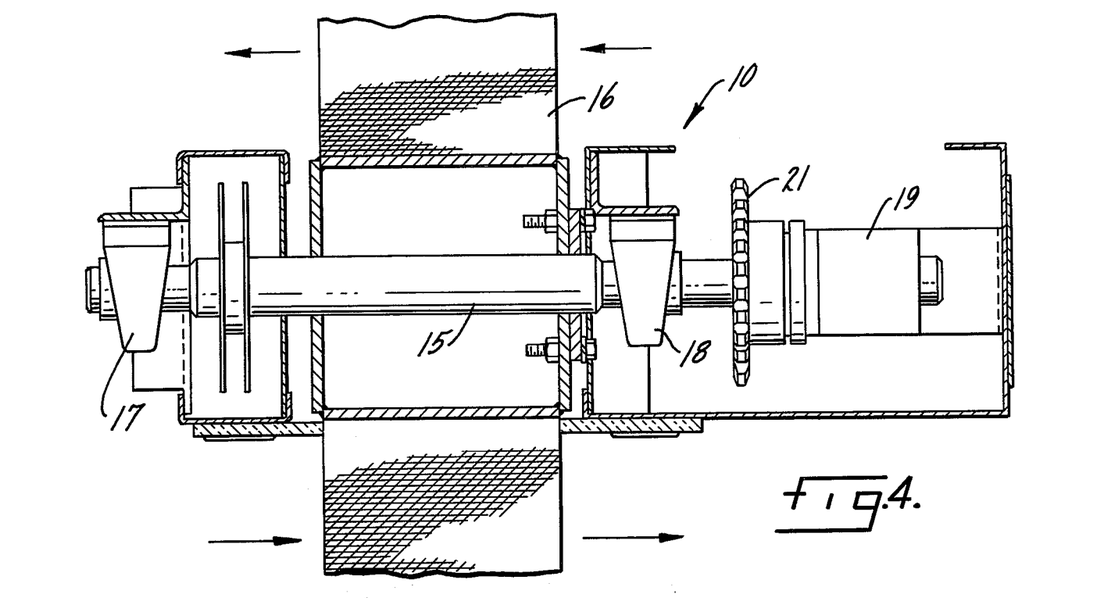
FIG. 4 is a detail sectional view taken approximately along line 4—4 in FIG. 2.

The internal construction of apparatus 10 is illustrated in FIGS. 2, 3 and 4. As shown therein, apparatus 10 comprises a cylinder 14 mounted upon a shaft 15. Cylinder 14 is packed with an air-permeable reactor medium 16 of high thermal capacity, having a large surface area that is exposed to the two air streams that pass through apparatus 10. The reactor medium 16 may constitute a metallic honeycomb structure or a monolithic structure. The reactor medium should be of light weight construction to assure rapid thermal response. Materials of this general kind are available in a variety of cell configurations and sizes affording a substantial range of design capabilities.

The air-permeable reactor medium 16, forming the working portion of cylinder 14, is preferably coated throughout with a precious metal catalyst to enable cylinder 14 to function as a catalytic converter. The preferred catalysts are precious metal catalysts, particularly platinum and palladium. Use of these particular metal catalysts allows for effective catalytic operation with inlet temperatures as low as 450° F. for some solvent laden gases. Other catalysts, such as base metal oxides, can be used; however, these are less advantageous in that they require higher operating temperatures and longer contact times within the reactor medium 16.

Shaft 15 is supported in suitable bearings 17 and 18 mounted on the frame of apparatus 10, and one end of shaft 15 is disposed in a pillow block 19 (FIGS. 3 and 4). A sprocket 21 affixed to shaft 15 is connected by a drive chain 22 to a sprocket 23. The drive sprocket 23 is mounted upon the output shaft 24 of a gear unit 25 driven by a variable speed electric motor 26. The operational speed of motor 26 is determined by a speed controller 27 connected to a thermal sensor 28 that senses the output temperature of the heated fresh air leaving apparatus 10 through duct section 12B (FIGS. 1 and 3).

A central barrier 31 in apparatus 10 maintains two separate passages through cylinder 14. That is, the central barrier 31 affords a cutoff zone that prevents any substantial flow of air between the two ducts 11 and 12 as the air carried by those two ducts traverses apparatus 10. Insulation is provided, on barrier 31 and in other appropriate locations in apparatus 10.

In operation, a contaminated hot exhaust airstream enters apparatus 10 through section 11A of duct 11; this exhaust air is laden with solvents and other oxidizable contaminants. Furthermore, the exhaust gas temperature is usually too high to permit direct release to the atmosphere. As the hot exhaust gas enters the rotating reactor medium 16 of cylinder 14, the high activity catalyst coating on the reactor medium surfaces causes immediate oxidation of the contaminants. That is, the hydrocarbons, organic compounds, and other oxidizable contaminants in the exhaust gas stream react chemically with the oxygen in the stream to form innocuous byproducts constituting water vapor and carbon dioxide. Assuming that the principal contaminants are ordinary industrial solvents, the chemical reaction releases approximately 100,000 BTU per hour per gallon of solvent, further increasing the temperature of the exhaust gas. However, most of this heat and the heat present in the entering exhaust stream is transferred to the rotating reactor medium 16.

As cylinder 14 is rotated by drive motor 26, acting through gear box 25, chain 22, and shaft 15, the two adjacent streams of fresh air from duct 12 and exhaust gas from duct 11 pass through the reactor medium 16 in the cylinder. A transfer of sensible heat is caused by the substantial difference in dry bulb temperature between the two air streams, aided by the large area heat transfer surface afforded by the reactor medium 16 and by laminar flow of the two air streams. Thus, as each segment of cylinder 14 rotates through the exhaust air stream (duct 11), heat is picked up by the literally thousands of square feet of heat transfer surface of the reactor medium 16 in the cylinder. The heated segment then rotates through a cutoff zone defined by the central barrier 31, which precludes any substantial crossflow from one air stream to the other. As the heated reactor medium segment enters the fresh air stream (duct 12) its heat is given up to the fresh air. Finally, the same segment of the reactor medium passes through another cutoff zone defined by the lower portion of barrier 31 and re-enters the exhaust air stream to again pick up heat. It should be noted that there are two sources of heat to be transferred to the fresh air stream; one heat source is the heat of the exhaust gas entering apparatus 10 and the other heat source is the heat generated by oxidation of the contaminants in the exhaust gas.

The fresh air and hot exhaust streams could pass through apparatus 10 in the same direction. However, the counterflow arrangement illustrated in FIG. 1 is preferred. It provides a heat transfer with an efficiency of up to 80%. A second benefit of the illustrated counterflow air stream arrangement is that the flow reversal, which takes place in every half cycle of cylinder 14, tends to keep the passages through the reactor medium 16 clean.

In many processes, the heated fresh air leaving apparatus 10 through duct section 12B (FIG. 1) is utilized in an industrial process that requires effective control of the fresh air temperature. For example, the heated fresh air may be employed as make-up air for an oven or other process equipment that produces the hot exhaust stream supplied to apparatus 10. Control of the temperature of the heated fresh air is effected by a conventional proportional speed controller 27 connected to the thermal sensor 28. Controller 27 operates to vary the speed of motor 26, which may be a conventional DC motor, adjusting the rotational speed of cylinder 14 in response to changes in the heated fresh air output temperature for apparatus 10. Unlike many heat recovery systems, which rely on dampers and mixture of air volumes to control final temperature, the illustrated apparatus employs a constant air flow volume for the fresh air. A fixed volume system that is not affected by damper or metering malfunctions is particularly advantageous in those instances in which system balance is critical.

Figure 5:
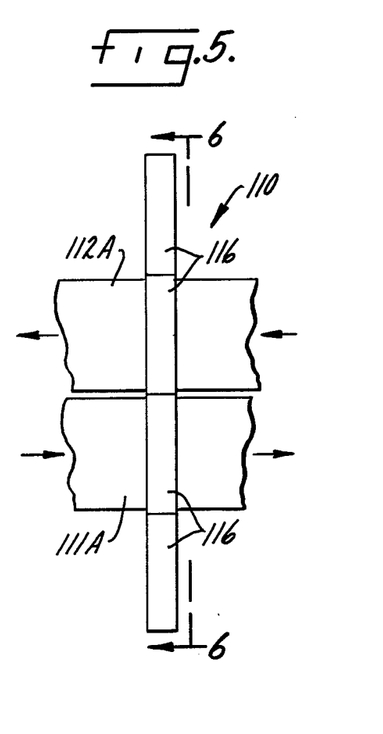
FIG. 5 is a simplified schematic plan view of a thermal regeneration and decontamination apparatus constructed in accordance with another embodiment of the present invention.
Figure 6:
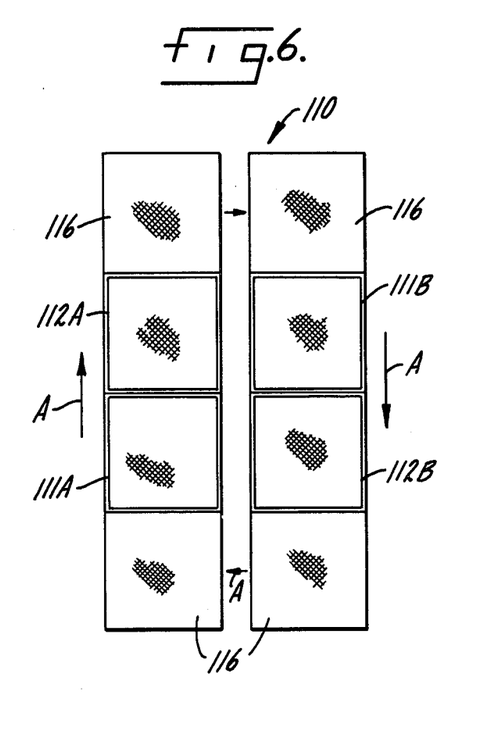
FIG. 6 is a simplified elevation view taken approximately along line 6—6 in FIG. 5.

FIGS. 5 and 6 illustrate, in somewhat schematic form, a modification of the present invention comprising a thermal regeneration and decontamination apparatus 110. In this construction, the air permeable reactor medium is constructed in the form of a plurality of rectangular segments 116 which are continuously moved around a closed rectangular path generally indicated by the arrows A. For this system, there are four ducts 111A, 111B, 112A and 112B. Ducts 111A and 111B are exhaust ducts carrying heated air laden with oxidizable contaminants, like duct 11 in the embodiment of FIGS. 1-4. Ducts 112A and 112B are fresh air ducts.

It can be seen that the operation of the arrangement shown schematically in FIGS. 5 and 6 is essentially the same as for the first described embodiment except for the path of movement for the reactor medium. As before, the speed of movement of the reactor medium can be varied to adjust the output temperature for the fresh air ducts.

Figure 7:
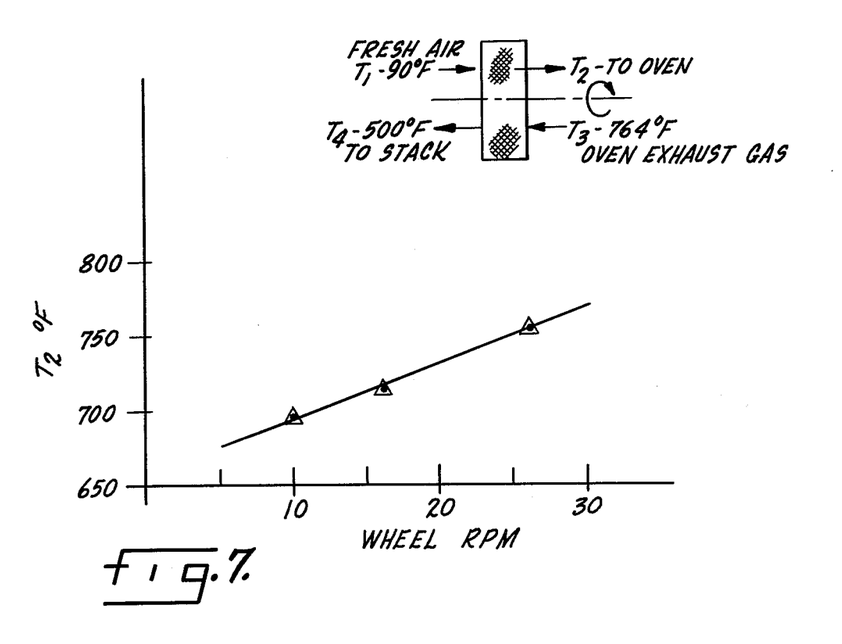
FIG. 7 is a graph of operation.

FIG. 7 is a graph showing how the speed of rotation or cycling of the regenerative catalytic mass supported by cylinder 14 is changed to get a desired temperature of output fresh air, that is, an operating example of the relation between cylinder rotation speed (RPM) and operating temperature for a steady rate of flow (constant volume) of air streams having given specific heats.

For the purpose of FIG. 7 it is assumed ambient fresh air enters at duct 12A at $T_1 = 90°$ F, and leaves through duct 12B at a (variable) outlet temperature $T_2$; whilst the incoming hot exhaust at 11A is at $T_3$ of 764° F, and leaves (11B) at 500° F.

Thus,
$T_1 = 90°$ F
$T_2$ and RPM are dependent on one another
$T_3 = 764°$ F
$T_4 = 500°$ F FIG. 7 shows the interdependency between the outlet temperature ($T_2$) and RPM; there is direct proportionality between $T_2$ and RPM (as would be expected since the greater the RPM the faster the eschange for given flow rates) and of course as $T_2$ increases or decreases there is a converse relation for $T_4$.

These relationships also enable $T_4$ to be varied, if desired, by varying RPM for given values of $T_1$ and $T_3$.

The form of the speed controller 27 and the thermal sensor 28 are known. Together they compare, for any difference, the delivered fresh air temperature ($T_2$) to a set value. A potentiometer (not shown) is varied in accordance with the analog representing this difference and the output of the potentiometer is used to vary a voltage in turn used to vary the speed of motor 26, which is a known D.C. motor having a speed which is variable dependent on the applied voltage.

Figure 8:
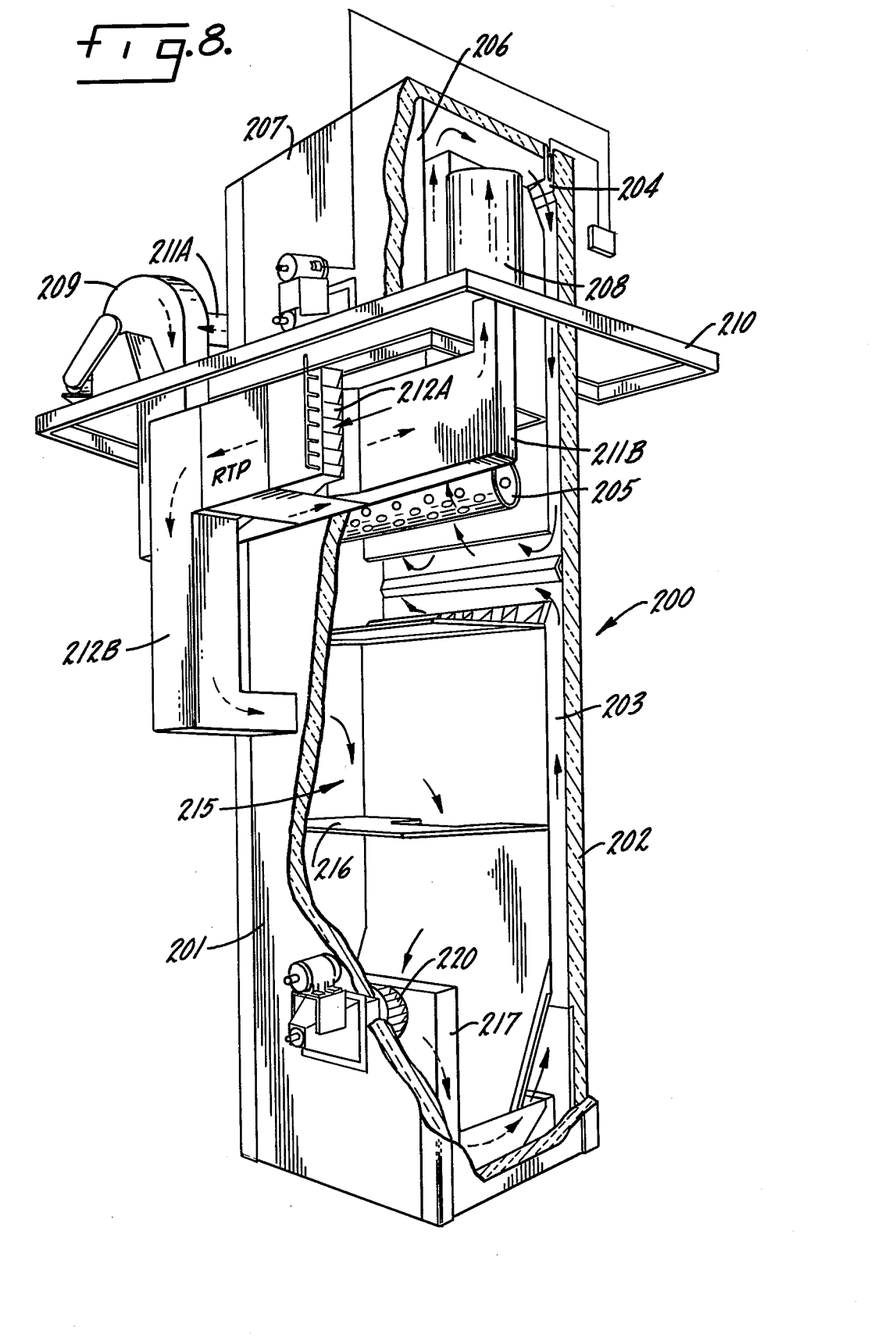
FIG. 8 is an isometric view of an industrial oven.

FIG. 8 depicts isometrically features of the present invention incorporated in a tower oven for processing small diameter wires coated with insulation, such as wires employed for motor armatures, coils and the like herein referred to as strands. After the wire is coated with a thin insulation, dispersed in a solvent, the strand is then introduced into the oven bottom shown in FIG. 8 and progresses upwardly therethrough while being exposed to the oven heat to remove the solvent and result in a baked coating of insulation surrounding the strand. A known oven of the general form shown in FIG. 8 has heretofore been equipped with two burners for establishing the necessary oven heat; under the present invention the oven may be considerably modified so that only one burner is necessary. This is accomplished by employing apparatus of the character described above in a unique manner.

Not only does the present invention enable fuel to be conserved as a result of elimination of the second burner, the temperature of fresh air leaving the rotary heat exchanger may be controlled by altering the RPM of the heat exchanger as already described. Unlike prevailing recuperator systems, which rely on dampers and a mixture of air volumes to control final temperature, an oven constructed in accordance with the present invention depends upon a constant volume of an ambient air stream without utilizing an air mixing system. The advantage of a fixed volume which will not be altered by damper malfunction or mis-metering, will be readily apparent to those skilled in the art when considering the heat balancing required for a tower oven. Thus, heated, controlled fresh air may be directed into the bottom zone of the oven supplying heat that previously would have been furnished by a second burner.

For purposes of a better understanding and a recognition of the general size of certain components, the tower structure illustrated in FIG. 8 in actual practice may be approximately twenty-four feet high.

The thermal regeneration and decontamination apparatus identified by reference character 10 in FIG. 1 may also be referred to as the regenerative thermal process apparatus (RTP) and the RTP equipment thus identified is identified in FIG. 8 by reference character RTP positioned near the top of the oven 200. The oven is further characterized by a pair of spaced, insulated side walls 201 and 202 which extend upwardly. A narrow chamber 203 is afforded inside the oven, between the side walls 201 and 202, and this narrow chamber serves as a vertical passageway for the coated strand to be processed. The wire exits from the top of the oven at a narrow slot 204 representing a known construction according to Winsor U.S. Pat. No. 3,448,969 where internal oven processing of such a strand is also disclosed.

A top zone muffler burner 205 is located in the top zone of the oven chamber and when the oven is operating a stream of hot exhaust gases is rising upwardly inside the oven in surrounding relation to the muffler burner 205, traveling upward therepast and into a hot gas exhaust duct 206. This stream of hot exhaust gases exits from duct 206, moving transversely across and then downward past the exit slot 204 for reasons explained in the Windsor patent. As denoted in FIG. 8 this stream of hot exhaust gas may be viewed as a constantly circulating stream inside the oven. Duct 206 is located inside a housing 207 at the top of the oven.

An exhaust stack or pipe 208 is located on the outside of the oven and serves as an exit for the hot effluent exiting into the ambient atmosphere as will be described below.

Figure 10:
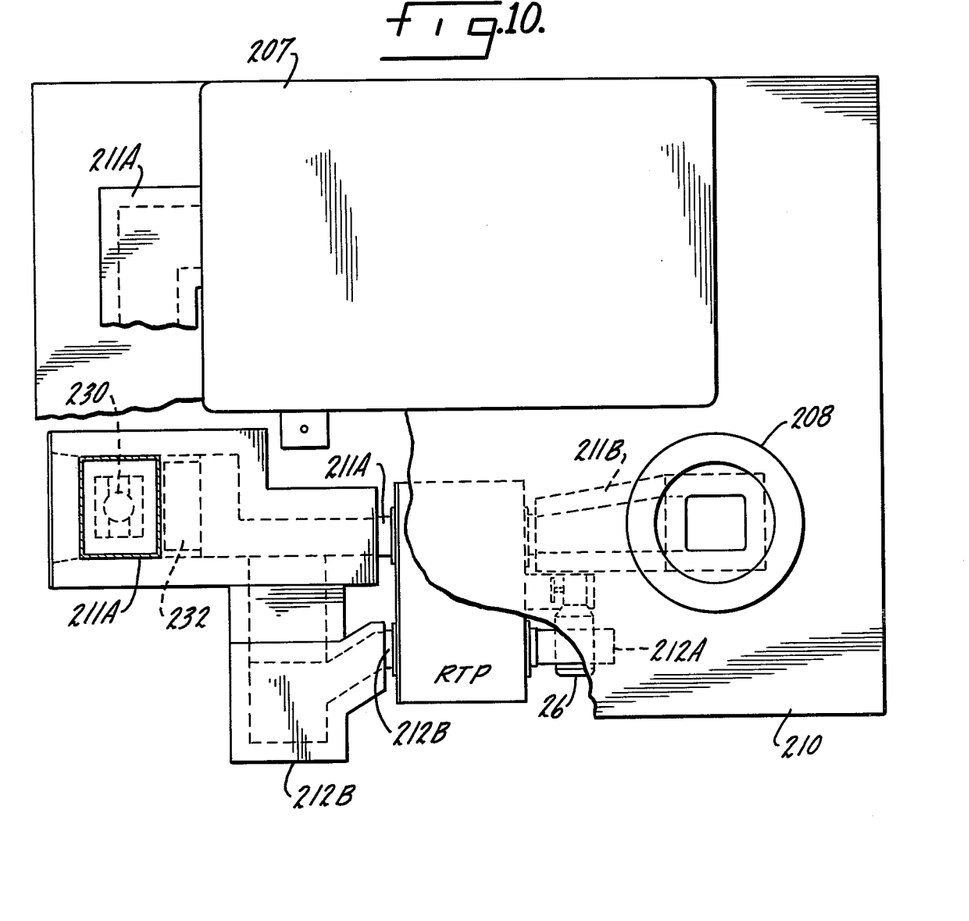
FIG. 10 is a view on the line 10—10 of FIG. 9.

The recirculating stream of hot gas inside duct 206 is tapped by a duct 211A, FIGS. 8 and 10, and this duct corresponds to duct 111A identified in FIG. 1. The contaminated hot gas inside duct 211A enters a blower 209 representing a continuation of duct 211A and the blower 209 directs the exhaust gases into the RTP unit precisely in the counter-flow (counter-flow to fresh air as will be described) relationship described above in connection with FIG. 1. The blower 209 is supported on a platform 210.

The RTP apparatus is, of course, positioned outside the oven chambers. A fresh air entrance duct 212A opens at the outside of the oven chamber and this duct corresponds to duct 12A for fresh air identified in FIG. 1. Thus, inside the RTP unit there is an exchange of heat between the stream of fresh air and the counter-flowing stream of contaminated hot exhaust. The heated fresh air leaves the RTP unit through a duct 212B which corresponds to duct 12B identified above in connection with FIG. 1. This duct is also located on the outside of the oven and at the lower end is configured to allow the heated fresh air to enter the interior of the oven at what may be termed a bottom zone heat chamber 215. By so directing the stream of heated fresh air into the bottom of the oven it is possible to eliminate the bottom zone burner heretofore employed in an oven of the character shown in FIG. 8. Thus the hot stream of heated fresh air is allowed to circulate downward past a baffle plate 216 into a bottom zone duct 217 and then laterally and upwardly into chamber 203 to impart heat to the wire which is entering the bottom of the heat creating chamber 203.

Returning now to the RTP unit, the contaminated gas in duct 211A was not only subjected to a heat exchange relationship with the fresh air but it was also decontaminated by virtue of the catalytic honey-comb inside the rotating reactor medium or wheel. The exchanged stream of exhaust gas leaves the RTP unit through duct 211B which corresponds to duct 11B, FIG. 1 and this duct communicates with the stack 208.

An additional blower 220 is employed to circulate the heated fresh air delivered to the bottom zone of the oven; in the area of the burner 205 the rising stream of heated fresh air mixes with the down-coming stream of exhaust gas as will be evident in FIG. 8.

Figure 9:
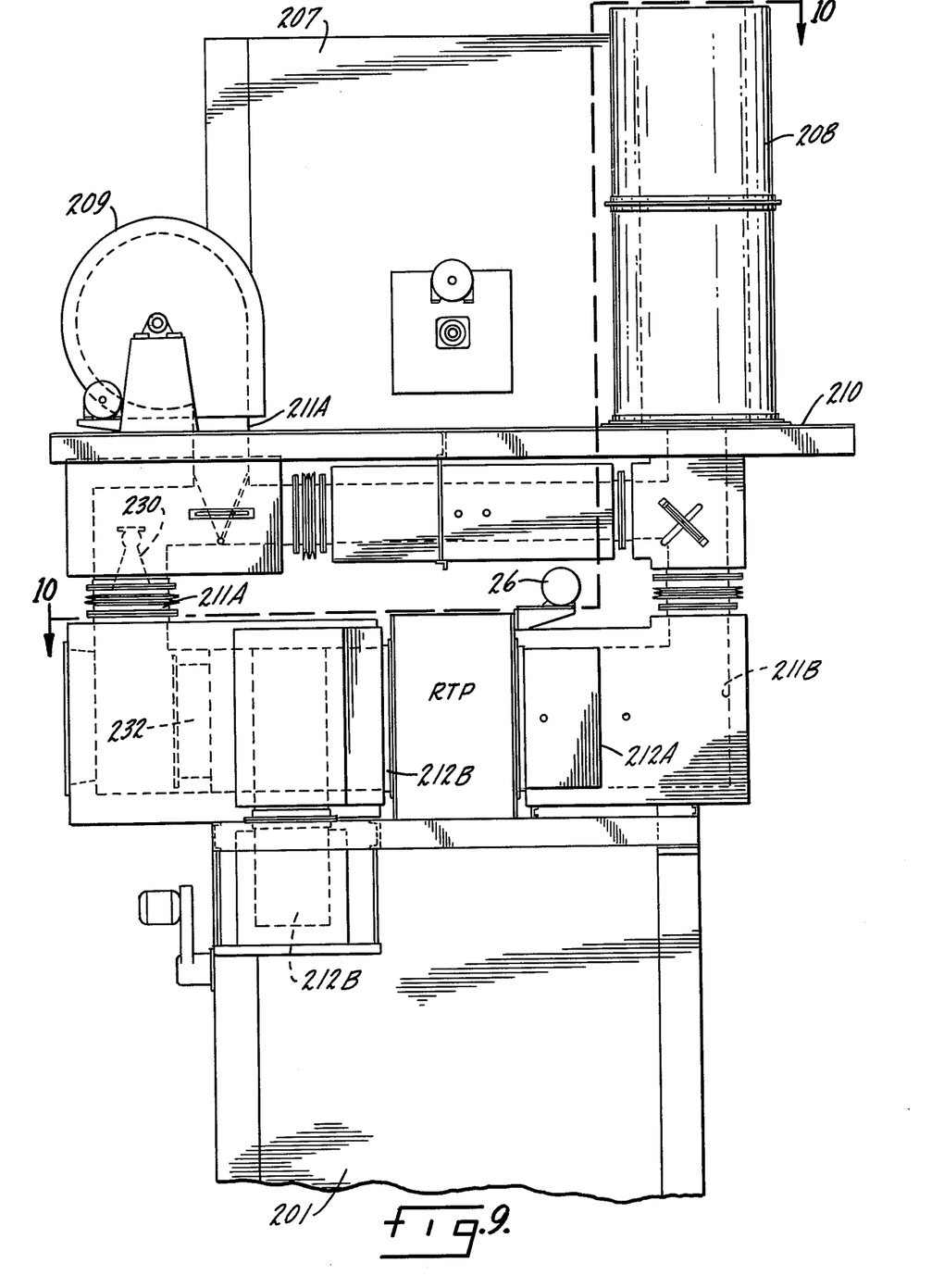
FIG. 9 is a side elevation of the top portion of the oven of FIG. 8.

In some chemical processes in which the present oven may be employed, the noxious exhaust gases may be sufficiently corrosive as to destroy any catalyst incorporated in the RTP unit. In such cases, the RTP unit will not incorporate a catalyst but will merely serve the heat exchange role. Accordingly, and referring to FIG. 9, a pre-burner 230 may be located in duct 211A, upstream of the RTP unit, to heat the incoming stream of exhaust gas to a predetermined high temperature where entrained chemicals, inimical to the catalyst, may be oxidized to an innocuous state. As a further precaution, in the event a catalyst is needed, a stationary or static catalyst chamber 232 may be located in duct 211A downstream of the pre-burner and upstream of the RTP unit.

The thermal regeneration and decontamination apparatus of the invention utilizes a common reactor medium as both a heat exchanger and a catalytic converter, suitable for employment in any drying, curing or other process which emits exhaust fumes containing oxidizable contaminants. In a single stage, the apparatus is capable of cleaning the exhaust gas and recovering latent energy, including both heat present in the exhaust gas entering the apparatus and heat generated in the course of oxidation of any contaminants which may be entrained in the exhaust gas. The noxious fumes and other contaminants in the exhaust gas can be effectively and rapidly converted into clean, innocuous byproducts, such as water vapor and carbon dioxide. The fresh air to which the latent energy is transferred can be used as make-up air in an industrial oven for the process producing the exhaust gas or as a heat source for virtually any other process. The counterflow arrangement makes it essentially self-cleaning with the reactor medium being purged in every cycle of operation. In the preferred construction, a constant volume is maintained for the fresh air side of the apparatus, with thermal control exercised by adjustment of the rate of movement of the reactor medium.

I claim:

1. Thermal regeneration and decontamination apparatus comprising:
    an air-permeable reactor medium of large surface area and high thermal capacity incorporating an oxidation catalyst;
    cycling means for continuously moving the reactor medium around a closed path traversing a first duct carrying an air stream laden with oxidizable contaminants, a first inter-duct cutoff zone, a second duct carrying a stream of relatively clean air, and a second inter-duct cutoff zone,
    whereby the contaminants in the first duct are catalytically oxidized to innocuous byproducts with release of substantial heat, which heat is exchanged to the air in the second duct;
    a sensor for sensing the temperature of one of the air streams and combined with control means for varying the rate of movement of the reactor medium, to vary the rate of heat exchange, so as to maintain a desired temperature in said one airstream.

2. Thermal regeneration and decontamination apparatus according to claim 1, in which the reactor medium is of annular configuration, mounted in a carrier cylinder, and the cycling means rotates the carrier cylinder.

3. Thermal regeneration and decontamination apparatus according to claim 1, in which the cycling means comprises a variable speed electric drive motor, and in which the thermal sensor is located in the second duct at the fresh air output from the apparatus, said control means being coupled to the thermal sensor and the drive motor for adjusting the speed of the drive motor in response to changes in the fresh air output temperature to maintain a substantially constant temperature for the fresh air output.

4. Apparatus according to claim 3 incorporated in an oven, having an elongated vertical axis, equipped with a burner at a predetermined level, the reaction medium being located in position to receive exhaust gases emitted by the oven, a duct for delivering ambient fresh air to the reaction medium for heat exchange with the exhaust gases and a duct for delivering the fresh air output from the reactor medium to the oven at a level below the burner.

5. Apparatus according to claim 4 in which the ambient fresh air stream and the stream of exhaust gases are directed through the reactor medium in opposite directions.

6. Apparatus according to claim 4 in which the oven has a stack for the exhaust gas outlet and in which there is a duct for delivering heat exchanged exhaust gas from the reactor medium to the stack.

7. In an industrial oven oriented on an elongated vertical axis and equipped with a stack for emitting exhaust gas:
    a burner at a predetermined level inside the oven chamber;
    a thermal regenerator moveable continuously about a closed path which alternately traverses both a first duct carrying a stream of hot exhaust gas and a second duct carrying a stream of fresher, cooler entrant air thereby to exchange heat between the two gas streams so that the temperature of the outgoing fresh air leaving the regenerator is raised and that of the exhaust gas is lowered;
    cycling means to so move the regenerator;
    a sensor, for sensing the temperature of one of the streams, combined with control means for varying the rate of movement of the regenerator, to vary the rate of heat exchange, so as to maintain a desired temperature in said one airstream;
    and a duct for directing into the oven the outgoing stream of fresh air leaving the regenerator.

8. An oven according to claim 7 in which the stream of entrant air is ambient fresh air.

9. An oven according to claim 7 in which the outgoing stream of air is directed into the oven at a level beneath the burner.

10. An oven according to claim 7 in which the streams move through the regenerator in opposite directions.

11. An oven according to claim 7 including a duct for directing to the stack the stream of exhaust gas leaving the regenerator and in which the entrant stream of air is ambient air.

12. An oven according to claim 11 in which the stream of air leaving the regenerator is directed into the oven chamber of a level beneath the burner.

13. An oven according to claim 12 in which the regenerator is rotary and in which the cycling means is a variable speed electric-drive motor, said sensor being located to sense the temperature of the air leaving the regenerator.

14. An oven according to claim 7 wherein a pre-burner is located in the first duct upstream of the thermal regenerator to oxidize entrained chemicals inimical to a catalyst.

15. An oven according to claim 14 wherein a stationary catalytic chamber is positioned in the first duct between the pre-burner and the catalytic chamber.

16. An oven according to claim 15 wherein a blower is located in the first duct upstream of the pre-burner.

* * * * *